(12) United States Patent
Willis et al.

(10) Patent No.: US 11,223,732 B1
(45) Date of Patent: Jan. 11, 2022

(54) MULTI-MODAL MULTI-DEVICE ALERTS

(71) Applicant: Xerox Corporation, Norwalk, CT (US)

(72) Inventors: Keith L. Willis, Rochester, NY (US);
Stephen F. Skrainar, Penfield, NY (US); Donald A. Brown, Honeoye Falls, NY (US); Andrew T. Martin, Honeoye Falls, NY (US); Keith S. Watson, Spencerport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/065,583

(22) Filed: Oct. 8, 2020

(51) Int. Cl.
*H04N 1/00* (2006.01)

(52) U.S. Cl.
CPC ....... *H04N 1/00477* (2013.01); *H04N 1/0049* (2013.01); *H04N 1/00244* (2013.01); *H04N 1/00408* (2013.01); *H04N 1/00488* (2013.01)

(58) Field of Classification Search
CPC .......... H04N 1/00477; H04N 1/00244; H04N 1/00408; H04N 1/00488; H04N 1/0049; G06F 3/1259; G06F 3/1294; G06F 3/1229; G06F 3/016
See application file for complete search history.

(56) References Cited

U.S. PATENT DOCUMENTS

| | | | |
|---|---|---|---|
| 7,518,745 B2 | 4/2009 | Guerraz et al. | |
| 8,378,979 B2 | 2/2013 | Frid et al. | |
| 9,753,541 B1 | 9/2017 | Robert et al. | |
| 9,774,749 B1 | 9/2017 | Skrainar et al. | |
| 9,836,929 B2 | 12/2017 | Rodriguez et al. | |
| 10,073,664 B2 | 9/2018 | Skrainar et al. | |
| 2002/0163662 A1* | 11/2002 | Kaufman | G06K 15/00 358/1.14 |
| 2007/0070033 A1* | 3/2007 | Guerraz | G06F 3/016 345/156 |
| 2017/0364319 A1* | 12/2017 | Skrainar | G06F 3/1229 |

* cited by examiner

*Primary Examiner* — Iriana Cruz
(74) *Attorney, Agent, or Firm* — Gibb & Riley, LLC (57) ABSTRACT

An app maintains different multi-modal output signatures. Each multi-modal output signature contains instructions for transducer output with speaker output and/or display output. Also, each multi-modal output signature is unique and different from all other multi-modal output signatures. Further, each different multi-modal output signature corresponds to only one of many possible alerts that may be generated by a printer. The app is adapted to control the printer user interface system and/or a portable device user interface system, to output these multi-modal output signatures in coordination.

20 Claims, 10 Drawing Sheets

MULTI-MODAL MULTI-DEVICE ALERTS

BACKGROUND

Systems and methods herein generally relate to the way in which machine generated alerts (such as printer errors) are output to users, and more particularly to using multiple modes of output (visual, sound, haptics, etc.) through multiple devices to provide such alerts.

Machine operators have received alerts from machines for much of mechanized history. These machine generated alerts can be as simple as the illumination of a sole warning light and as complex as an animated avatar explaining machine operational states to operators using natural language processing.

The trick is to grab the operator's attention and convey the meaning of the alert to the operator as easily and completely as possible. Attempting to achieve this goal, designers have sometimes combined lights and sounds (e.g., a buzzer accompanying a flashing red light). Other offerings provide extensively detailed information on displays or through symbols. However, despite these laudable efforts, many times the operator is not properly made aware of the alert, intentionally ignores the alert, or fails to understand the meaning of the alert; all to the detriment of successful continued machine operation.

SUMMARY

In order to address these issues, systems herein include, among other components, a printing device (such as a multi-function printer (MFP)) and a computer (e.g., server) maintaining a computer application (app) related to the printer. The printer has a printer user interface system that includes various components, such as a printer display device, a printer speaker, a printer transducer, etc.

The computer is adapted to communicate with portable user devices through a computer network. The computer is adapted to provide the app to the portable user devices through the computer network. The portable user devices each include a portable device user interface system made up of various components, such as a portable device display screen, a portable device speaker, a portable device transducer, etc. The app is adapted to control the portable user device to have it communicate with the printer.

The app maintains many different multi-modal output signatures. Each multi-modal output signature contains instructions for transducer output with speaker output and/or display output. The app is adapted to control the printer user interface system and/or the portable device user interface system, to output these multi-modal output signatures.

Also, each multi-modal output signature is unique and, therefore, different from all other multi-modal output signatures. At least one of the multi-modal output signatures coordinates patterns of the transducer output, speaker output, and display output to occur in synchronization and produce an identical output pattern. Further, each different multi-modal output signature corresponds to only one of many possible alerts that may be generated by the printer, and such alerts are based on operational statuses of printing and scanning operations of the printer and are not just responses to user inputs.

The app can also be adapted to control the printer user interface system and the portable device user interface system so that they both simultaneously provide an identical multi-modal output signature for a single alert of many different alerts generated by the printer.

Additionally, the app can be adapted to control the portable device user interface system to output the multi-modal output signature from at least the portable device transducer, while controlling the printer user interface system to output the multi-modal output signature from at least the printer display device. In these situations, the app can be adapted to control the portable device transducer and the printer display device to output the multi-modal output signature in coordination with each other.

The printer user interface system can also have exterior lighting, and the app is adapted to control this exterior lighting to output the multi-modal output signatures. In other examples. In other example, the app is adapted to control the portable device user interface system to output the multi-modal output signature from at least the portable device transducer while controlling the printer user interface system to output the multi-modal output signature only from the exterior lighting.

Using such systems, the method embodiments herein perform many functions. In one example, the methods herein store the app in the computer and maintain, in the app, the multi-modal output signatures. Again, each multi-modal output signature includes instructions for transducer output with speaker output and/or display output, each multi-modal output signature is unique and different from all other ones of the multi-modal output signatures, and each different multi-modal output signature corresponds to only one of many possible alerts generated by a printing device. The multi-modal output signatures can coordinate the patterns of the transducer output, speaker output, and display output to occur in synchronization and thereby produce an identical output pattern.

Additionally, these methods communicate, using the computer, with the portable user devices through the computer network. Methods herein provide the app from the computer to the portable user devices through the computer network. Additionally, such methods control, using the app, the portable user devices to communicate with the printing device.

In such methods herein, alerts are generated by the printing device based on operational statuses of printing and scanning operations of the printing device. These methods also control, using the app, the printing device user interface system and/or the portable device user interface system to output a different one of these multi-modal output signatures for each different alert generated by the printing device.

In one example, the app can be used to control the printing device user interface system and the portable device user interface system to both simultaneously provide the same multi-modal output signature for a given alert generated by the printing device. In another example, these methods can use the app to control the portable device user interface system to output the multi-modal output signature from at least the portable device transducer, while controlling the printing device user interface system to output (in coordination with the portable device user interface system) the same multi-modal output signature from at least the printing device display.

Also, these methods can control any exterior lighting of the printing device to output the multi-modal output signatures in coordination with other outputs of that multi-modal output signature. Thus, for example, these method can use the app to control the portable device user interface system to output the multi-modal output signature from at least the portable device transducer, while controlling the printing device user interface system to output the multi-modal output signature only from the exterior lighting.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, many times an operator is not properly made aware of a machine generated alert, intentionally ignores the alert, or fails to understand the meaning of the alert; all to the detriment of successful continued machine operation. These issues result from limitations in machine feedback. Also, there can be many touchpoints that may be present on multiple devices, which can add confusion to alert communications.

In order to address these and other issues, the systems and methods herein provide uniquely distinctive alerts across multiple user touchpoints and through multiple sensory outputs (sight, sound, and sensory feedback, etc.) and these "multi-modal" alerts are based on a defined triggering event. These multi-modal alerts are consistent and cohesive across all such touchpoints and provide an untapped opportunity for brand recognition to increase customer loyalty and customer confidence in the product. Therefore, whether local or remote, multiple devices herein provide a coordinated sensory experience for each given alert.

Thus, the machine generated alerts provided by methods and systems herein are multi-modal or multi-sensory because many different modes or forms (e.g., auditory, visual, vibrational, etc.) of sensory output are combined. In some limited examples, the multi-modal alerts can be provided through lighted indicators and user interface screens, speakers can output audio sounds of low and high fidelity, transducers (vibrators) can output haptic vibrational feedback. Further, these multi-modal alerts are "multi-device" because such can be simultaneously output through multiple devices in coordination, such as at the operating machine itself and at accessory devices that may be remote from that device.

The multi-modal, multi-device alerts are each unique from one another so as to instantly and intuitively convey alert meaning and promote brand recognition across multiple touchpoints. This is highly useful because a cohesive, integrated multi-modal and multi-device set of brand unique experiences helps build brand recognition and loyalty.

Visual, auditory, and haptic feedback modes are used to respond to user inputs where, for example, an input device will flash, beep, or vibrate when users physically touch input devices. Such feedback elements are useful to confirm back to the user that the machine has received the user inputs. However, a different situation exists when it comes to machine alerts that are automatically generated by the machine when the machine determines that user attention is needed to address a machine problem or perform an interaction with the machine. For example, machines often automatically generate alerts when the machine needs to pause its operations because of a problem with a processing component or supply element, and machines automatically generate alerts to notify users that production items have been produced and are ready to be picked up.

One issue with such automatically generated machine alerts is that, unlike multi-modal feedback responses to user inputs, the machine generated alerts are usually provided in a single mode (just visual or just auditory) and automatic machine generated alerts are not provided using vibratory outputs. Specifically, while the technology of user input feedback sees intuitive benefit in confirming a user's touch with a contemporaneous vibrational haptic feedback output, such outputs are not used to notify users of machine alerts and, therefore, haptic feedback is seen as not having benefit outside input-confirming feedback. Thus, machine generated alerts are limited to light and sound modalities, and the realm of haptic outputs is generally thought to be reserved only for confirming that the user properly touched a desired input location.

Breaking away from such teachings, the multi-modal and multi-device automatic machine alerts generated by systems and methods herein utilize haptic components avoided conventionally. Further, the systems and methods herein do not merely add haptic feedback as an additional mode of output to the existing sound and light outputs. Instead, the systems and methods herein go further and use different combinations of output modes on different devices and use different patterns for different alerts and combine brand recognition into such alerts. Thus, all outputs and alerts provided by the systems and methods herein can include brand recognition to increase user loyalty and confidence.

For example, a printer can produce one pattern of lighting, sound, and vibrations (a first multi-modal signature) when a paper jam occurs and a different pattern of lighting, sound, and vibrations (a second multi-modal signature) when a print job has been completed and is ready to be retrieved. Both multi-modal signatures can include a brand distinctive pattern as part of the overall pattern while including other pattern elements to distinguish one alert from another.

Additionally, different modes of the multi-modal signature can be output on different devices and these outputs are coordinated with each other. Thus, for example, a portable user-carried or user-wearable device (smart phone, smart watch, etc.) may only provide the vibratory mode of the multi-modal signature and the operating machine may flash a light and/or play a sound in coordination with the vibration being output through the portable user device. In this manner the user is provided a pattern of vibrations locally, while the operating machine outputs the same pattern through visible/audible outputs (at the same time and in synchronization with the vibrational pattern). The vibrations get the user's attention and the visible/audible outputs help direct the user's attention to the machine that needs user interaction.

While a very small numbers of examples are set forth below, those ordinarily skilled in the art would understand that all embodiments of systems and methods herein: provide brand recognition through the multi-mode, multi-device alerts; output different alert signatures for different alerts to help the user intuitively and quickly recognize the nature of the alert; coordinate/synchronize the alerts provided on the different devices to help user's recognize the machine needing attention; etc.

In greater detail, the systems and methods herein include, among other components, at least one printing device (such as a multi-function printer (MFP 204)) and at least one computer 200 (e.g., server) maintaining a computer application (app 252) related to the printing device 204. The printing device 204 has a printer user interface system that includes various components, such as a printer display device 262, a printer speaker 264, and a printer transducer 266, etc.

Figure 1:
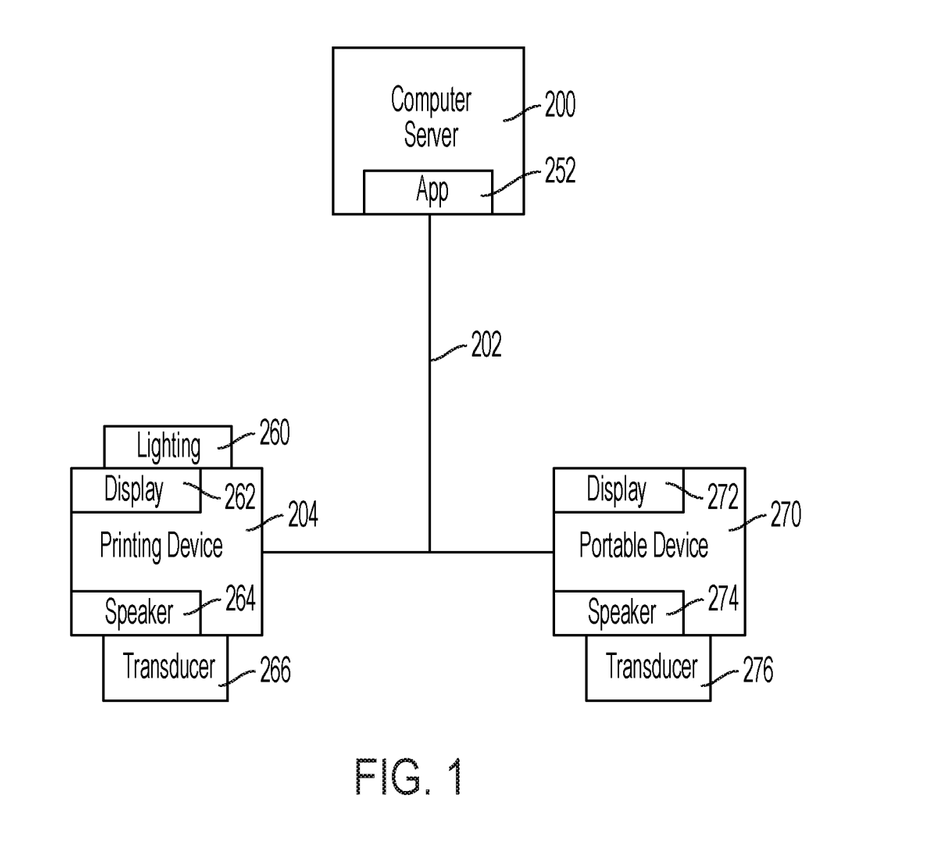
FIG. 1 is a schematic diagram illustrating systems herein.

The computer 200 is adapted to communicate with portable user devices 270 (laptop computers, smart phones, wearable devices, etc.) through a local and/or wide area, wired and/or wireless, computer network 202. The computer 200 is adapted to provide the app 252 to the portable user devices 270 through the computer network 202. As shown in FIG. 1, the portable user devices 270 each include a portable device user interface system made up of various components, such as a portable device display screen 272, a portable device speaker 274, a portable device transducer 276, etc. The app 252 is adapted to control the portable user devices 270 to communicate with the printing device 204.

The app 252 maintains many different multi-modal output signatures. Each multi-modal output signature contains instructions for transducer output with speaker output and/or display output. The app 252 is adapted to control the printer user interface system and/or the portable device user interface system, to output these multi-modal output signatures.

Also, each multi-modal output signature is unique and, therefore, different from all other multi-modal output signatures. At least one of the multi-modal output signatures coordinates patterns of the transducer output, speaker output, and display output to occur in synchronization and produce an identical output pattern. Further, each different multi-modal output signature corresponds to only one of many possible alerts that may be generated by the printing device 204, and such alerts are based on operational statuses of printing and scanning operations of the printing device 204 and are not limited to occurring just as responses to user inputs.

The app 252 is adapted to control the printer user interface system and the portable device user interface system so that they both simultaneously provide an identical multi-modal output signature for each different alert of many different alerts that can be generated by the printing device 204.

In one exemplary multi-modal output signature, the app 252 is adapted to control the portable device user interface system to output the multi-modal output signature from at least the portable device transducer 276, while controlling the printer user interface system to output the multi-modal output signature from at least the printer display device 262. In these situations, the app 252 can adapted to control the portable device transducer 276 and the printer display device 262 to output the multi-modal output signature in coordination with each other.

The printer user interface system can also have exterior lighting 260, and the app 252 is adapted to control this exterior lighting 260 to output the multi-modal output signatures. The exterior lighting 260 is external to any display screens 262 and is used to light up the exterior of the printing device 204 or light up the floor, walls, etc., surrounding the printing device 204 (potentially in different colors). Basically, the display screen 262 can only be seen from a close distance; however, the exterior lighting 260 is positioned to light up much larger surfaces than the display screen 262 (exterior panels of the printing device 204, floor areas, wall areas, etc., increasing the likelihood that the output from the exterior lighting 260 will be seen from a distance beyond the viewing distance of a display screen or monitor 262.

Thus, in one example, the app 252 can be adapted to control the portable device user interface system to output the multi-modal output signature from at least the portable device transducer 276 (to obtain the user's attention) while controlling the printer user interface system to output the multi-modal output signature only from the exterior lighting 260, in synchronization, to help guide the user's attention toward the machine that is issuing the alert. To increase user recognition of the alert, the visual mode of the multi-modal output signatures can be output from a display screen 262 and the exterior lighting 260 simultaneously and in coordination.

A very few examples of possible multi-modal output signatures are shown conceptually in FIGS. 2-5. More specifically, these figures show time aligned chart diagrams with time extending along the x-axis (horizontal) and different modes of time-coordinated (time-matched, time-synchronized) output extending along the y-axis (vertical). Differently shaded boxes in FIGS. 2-5 conceptually represent app instructions for: printer vibrational output 302 through the printer transducer 266; printer sound output 304 through the printer speaker 264; printer visual output 306 through the printer display 262 and/or the printer exterior lighting 260; portable device vibrational output 312 through the portable device transducer 276; portable device sound output 314 through the portable device speaker 274; and portable device visual output 316 through the portable device display 272.

Each shaded box 302-316 in FIGS. 2-5 can conceptually represent a single output (e.g., single note, single vibration, single light display) or each shaded box 302-316 can represent a pattern of outputs that are repeated over time. Thus, the pattern of outputs represented by one of the boxes 302-316 can be a series of musical notes, short song, etc., can be a series of vibrations coordinated with the musical notes or song that occur in time coordination with the notes or song, can be a series of different color or brightness lights that also emit in time coordination with the notes, song, vibrations, etc.

Figure 2:
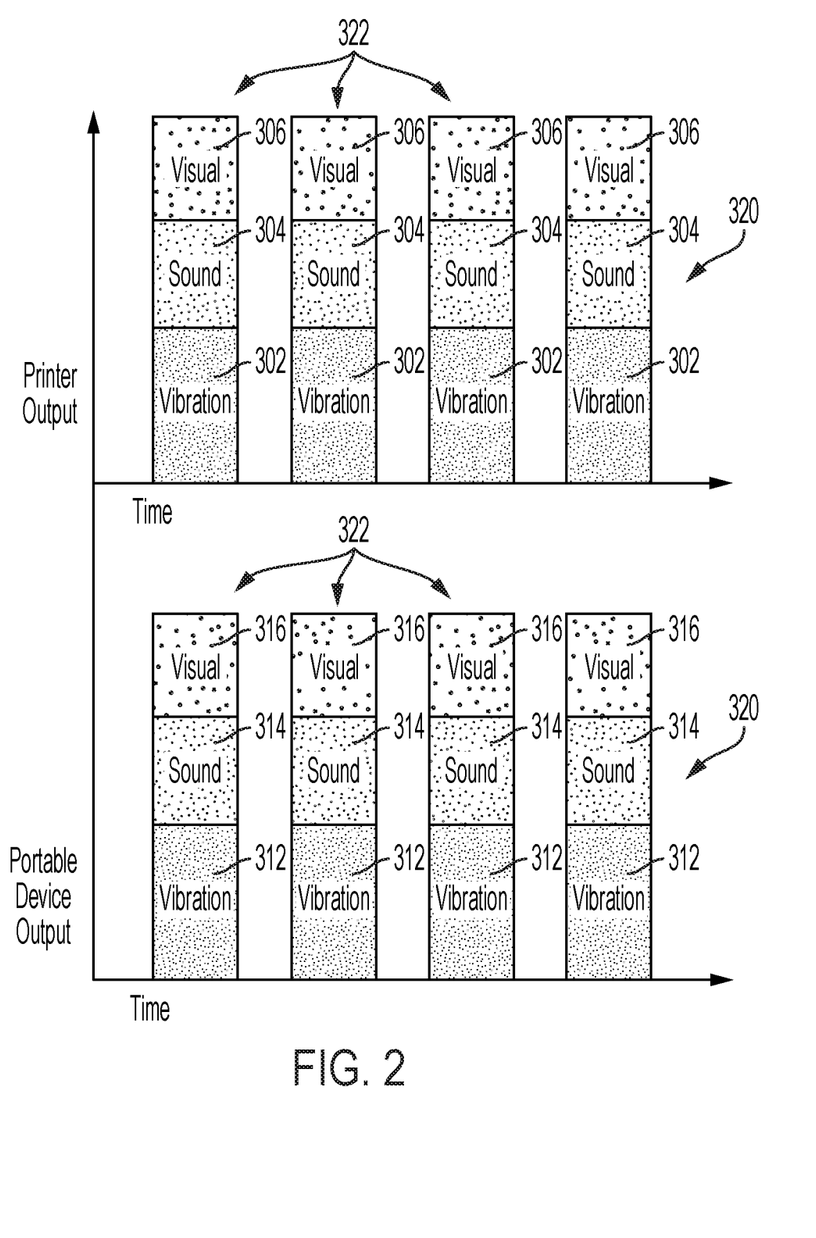
FIG. 2-5 are charts of outputs over time that are produced by systems herein.

FIG. 2 illustrates a multi-modal output signature having app instructions that control the printer device 204 and portable device 270 identically and that provides the exact same vibrational output (302, 312), sound output (304, 314), and visual output (306, 316) through both the printer device 204 and portable device 270 in time coordination with each other.

Figure 3:
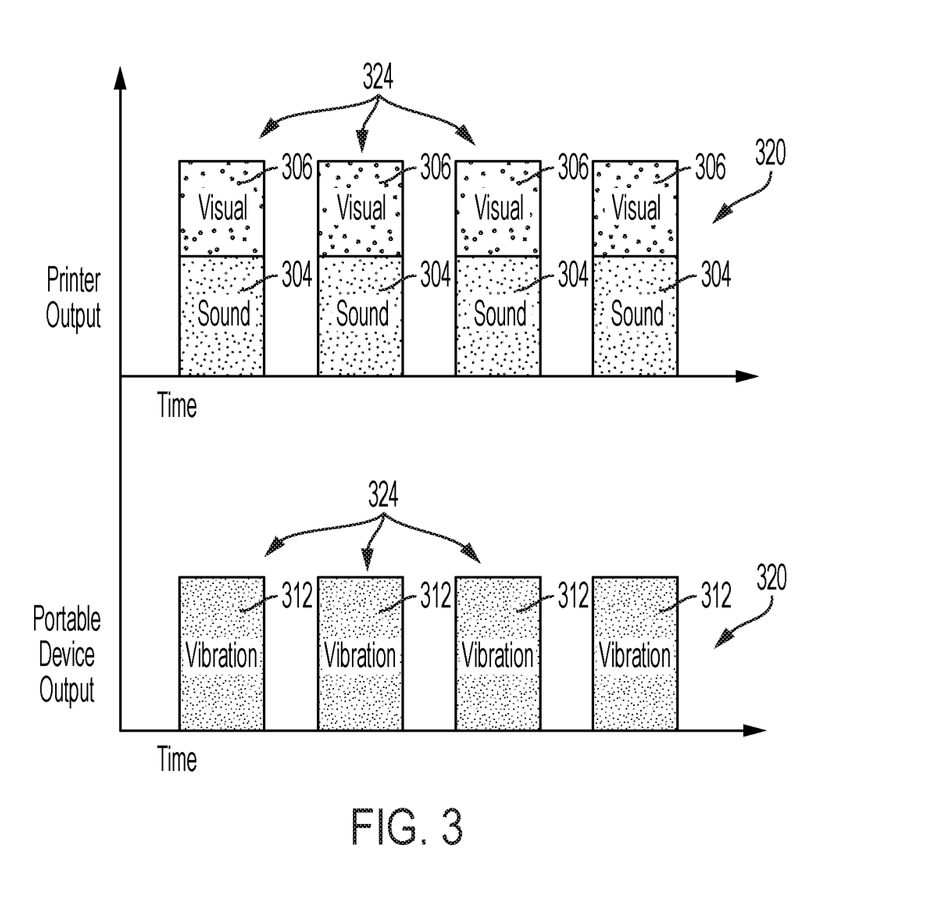

In contrast, FIG. 3 illustrates a multi-modal output signature having app instructions that control the printer device 204 and portable device 270 to provide different modes of outputs. As shown in FIG. 3, while the portable device 270 is outputting only vibrational output 312 (possibly to limit distracting individuals other that the user), the printer 204 is simultaneously outputting sound output 304 and visual output 306 that are coordinated with the singular vibrational output 312.

Figure 4:
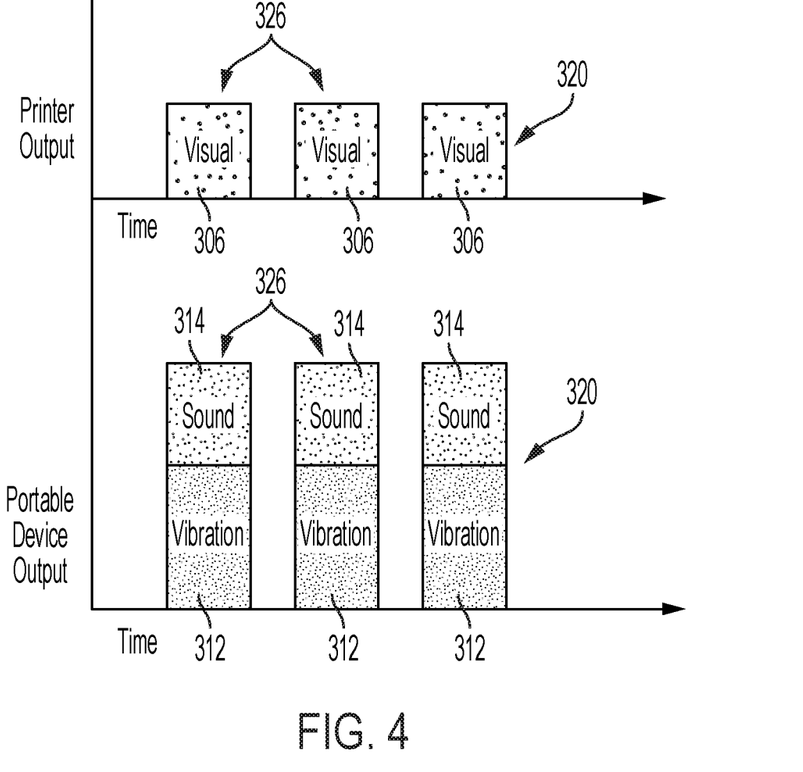

FIG. 4 illustrates another exemplary multi-modal output signature having app instructions that control the printer device 204 and portable device 270 to again provide different modes of outputs. Specifically, FIG. 4 shows that the printer outputs only visual output 306, while the portable device is simultaneously outputting both vibrational output 312 and sound output 314 that are coordinated with the visual output 306.

Figure 5:
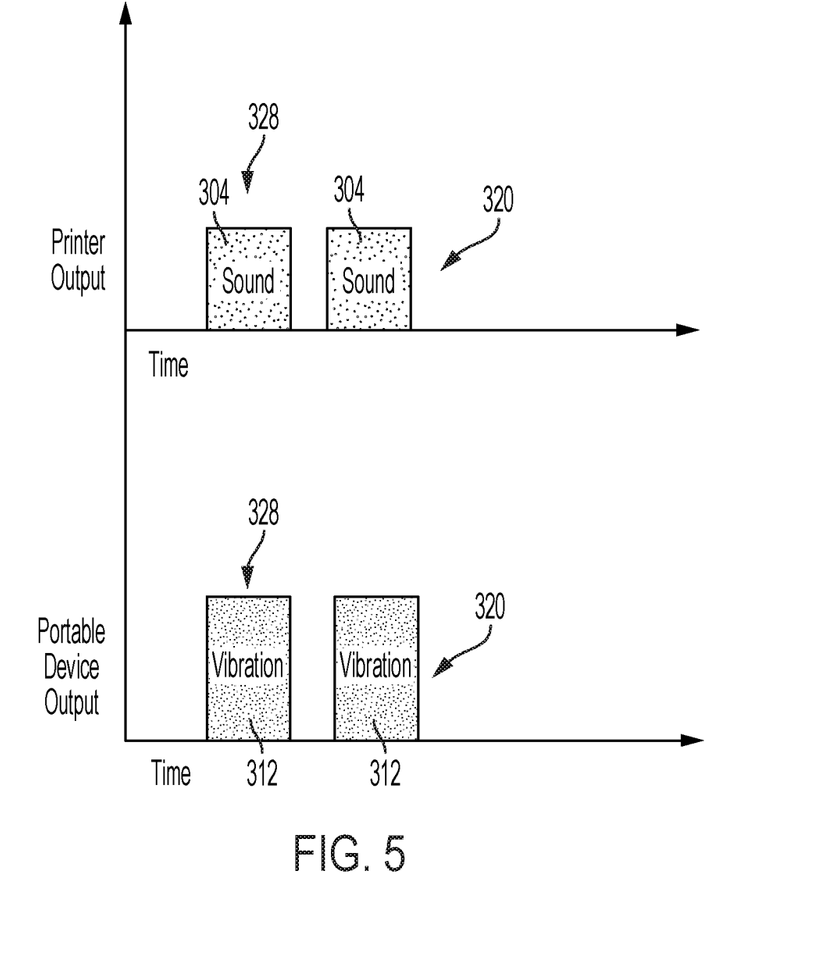

FIG. 5 illustrates yet another exemplary multi-modal output signature having app instructions that control the printer device 204 and portable device 270 to again provide different modes of outputs. Specifically, FIG. 5 shows that the printer outputs only sound output 304, while the portable device is simultaneously outputting only vibrational output 312 that is coordinated with the sound output 304.

In other examples, one or more of the sets of shaded boxes may represent a tune or advertising jingle by which users may be provided brand recognition (brand output is referenced in the drawings using identification numeral 320) while the other sets of shaded boxes can be different to distinguish one alert from another (machine generated alerts are referenced in the drawings using identification numerals 322-328). In these examples, as shown in FIG. 2, the first three outputs 322 are alert specific, while the last output is a brand recognition output 320. FIG. 3 shows that the first three outputs 324 are a different alert (different from alert 322); however, at the end the same brand recognition output 320 is provided. Similarly, FIGS. 4 and 5 show yet more different alert specific outputs 326, 328; however, again, at the end the same brand recognition output 320 is provided. Therefore, the systems and methods herein provide different multi-modal, multi-device outputs (322-328) for each different machine generated alert; while, as part of the same series of outputs, also providing brand-specific output 320.

Figure 6:
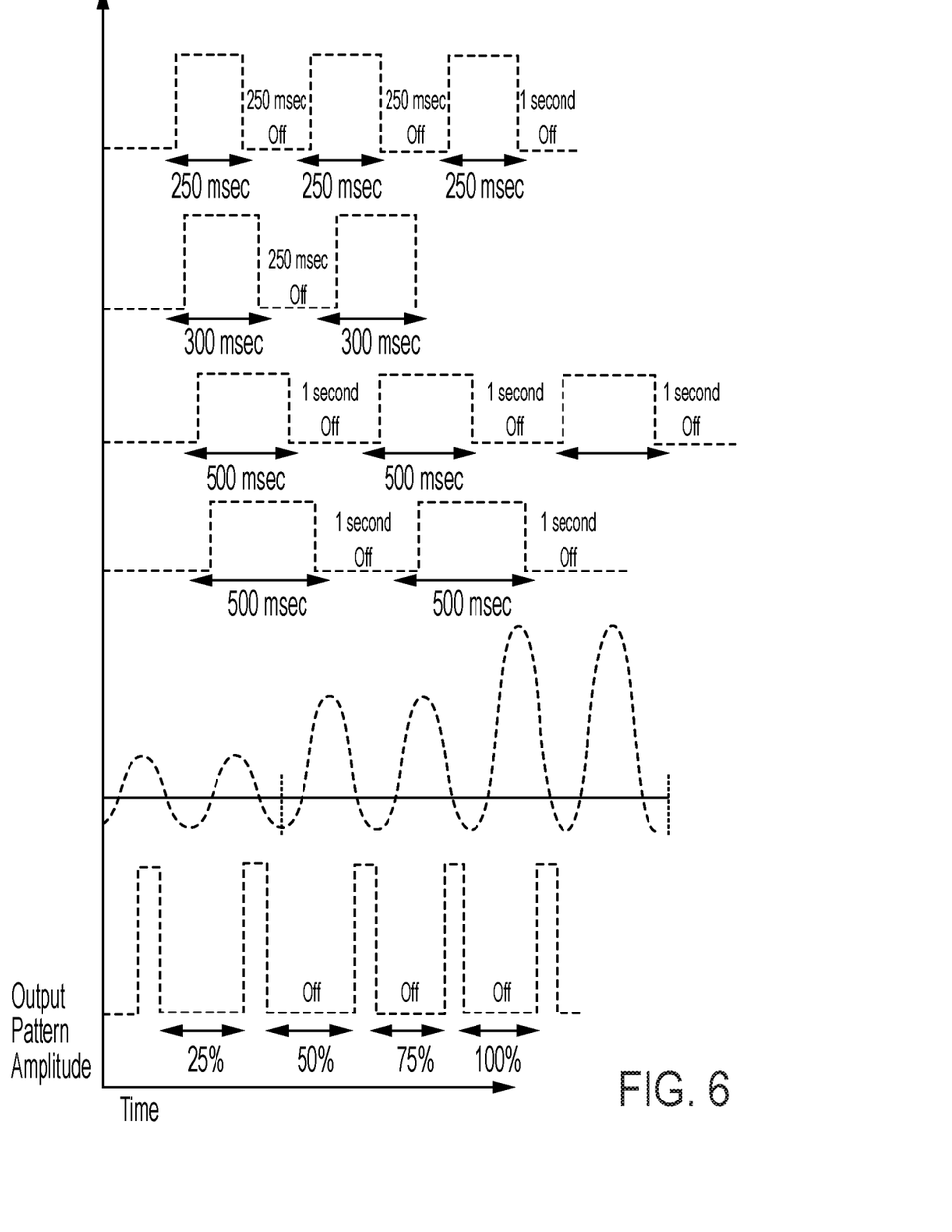
FIG. 6 is a chart of outputs over time that illustrates some of the vibrational patterns produced by systems herein.

FIG. 6 illustrate some of the vibrational patterns that can be included in the app instructions in the multi-modal output signatures maintained by the app. As can be seen in FIG. 6, square wave and sinuous wave patterns having different on times, off times, amplitudes, etc., can be included in the app instructions in the multi-modal output signatures maintained by the app. FIG. 6 shows that the different vibrational patterns can have different on times, different off times, different numbers of pulses, etc.

Figure 7:
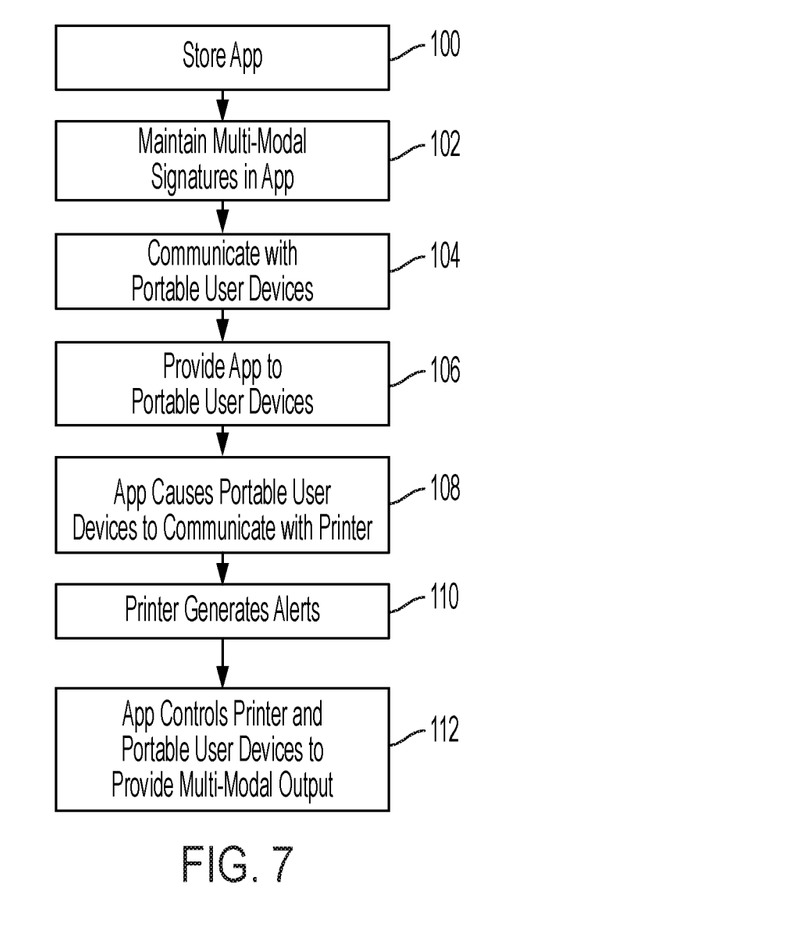
FIG. 7 is a flow diagram of various methods herein.

FIG. 7 is flowchart illustrating exemplary methods herein. In item 100, these methods store the app in the computer. Item 102 shows that these methods maintain, in the app, multi-modal output signatures. Again, each multi-modal output signature includes instructions for transducer output with speaker output and/or display output, each multi-modal output signature is unique and different from all other ones of the multi-modal output signatures, and each different multi-modal output signature corresponds to only one of a plurality of alerts generated by a printing device. The multi-modal output signatures can coordinate the patterns of the transducer output, speaker output, and display output to occur in synchronization and thereby produce an identical output pattern.

Additionally, as shown in item 104, these methods communicate, using the computer, with the portable user devices through the computer network. In item 106, these methods provide the app from the computer to the portable user devices through the computer network. Additionally, in item 108 such methods control, using the app, the portable user devices to communicate with the printing device.

In item 110, alerts are automatically generated by the printing device based on operational statuses of printing and scanning operations of the printing device (e.g., job receipt, job error, supply depletion, mechanical failure, item jam, power issues, job completed, job output ready for pickup/delivery, etc.). Therefore, the automatic alerts generated in item 110 are different from input-confirming feedback responses that occur in response to, and immediately after, user inputs. In other words, the machine generated alerts are different from haptic feedback because the alerts are automatically generated by the machine, not based on user input, but instead based on machine status. Also, many of the automatic machine generated alerts are not a component of error-free machine operations or such alerts occur only at the beginning or end of error-free machine operation, while input-confirming haptic feedback is only produced in response to user input.

As shown in item 112, these methods also control, using the app, the printing device user interface system and/or the portable device user interface system to output a different one of these multi-modal output signatures for each alert generated by the printing device. In one example of the processing in item 112, the app can be used to control the printing device user interface system and the portable device user interface system to both simultaneously provide the same multi-modal output signature for a given alert generated by the printing device. In another example of the processing in item 112, these methods can use the app to control the portable device user interface system to output the multi-modal output signature from at least the portable device transducer, while controlling the printing device user interface system to output (in coordination with the portable device user interface system) the same multi-modal output signature from at least the printing device display.

Also, in item 112, these methods can control exterior lighting of the printing device to output the multi-modal output signatures in coordination with other outputs of that multi-modal output signature. Thus, for example in item 112, these method can use the app to control the portable device user interface system to output the multi-modal output signature from at least the portable device transducer, while controlling the printing device user interface system to output the multi-modal output signature only from the exterior lighting.

Figure 8:
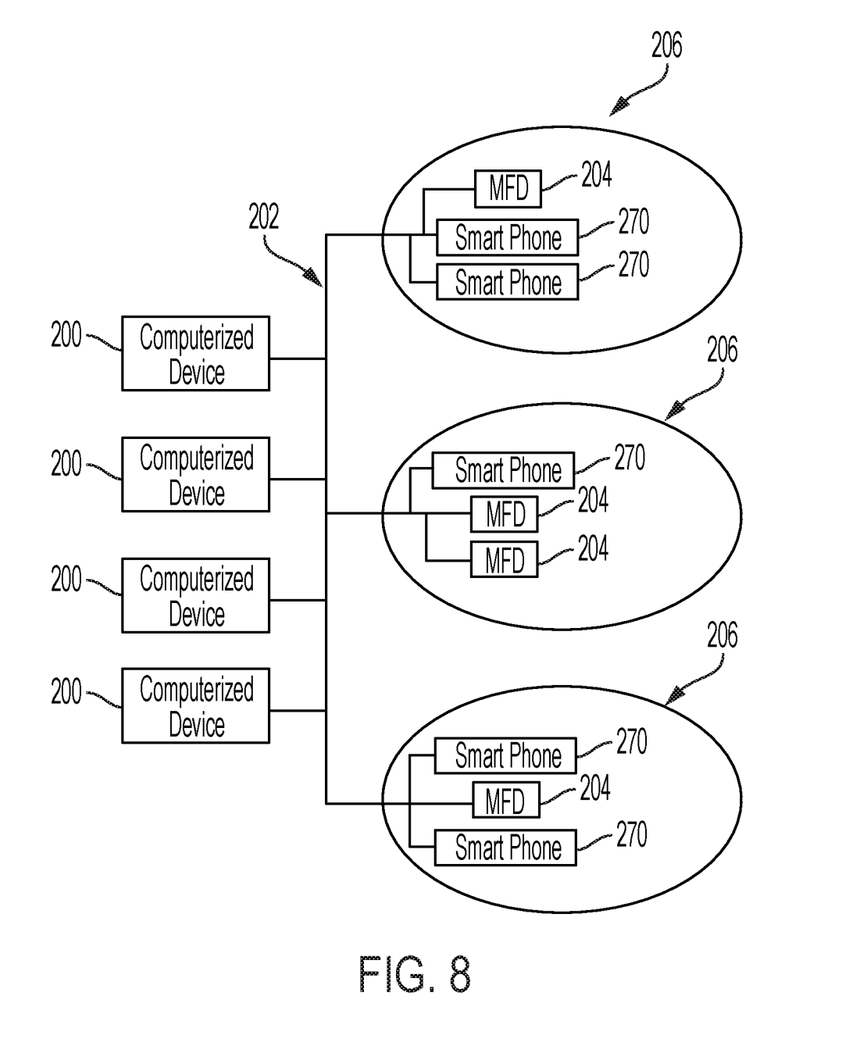
FIG. 8 is a schematic diagram illustrating systems herein.

As shown in FIG. 8, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 9:
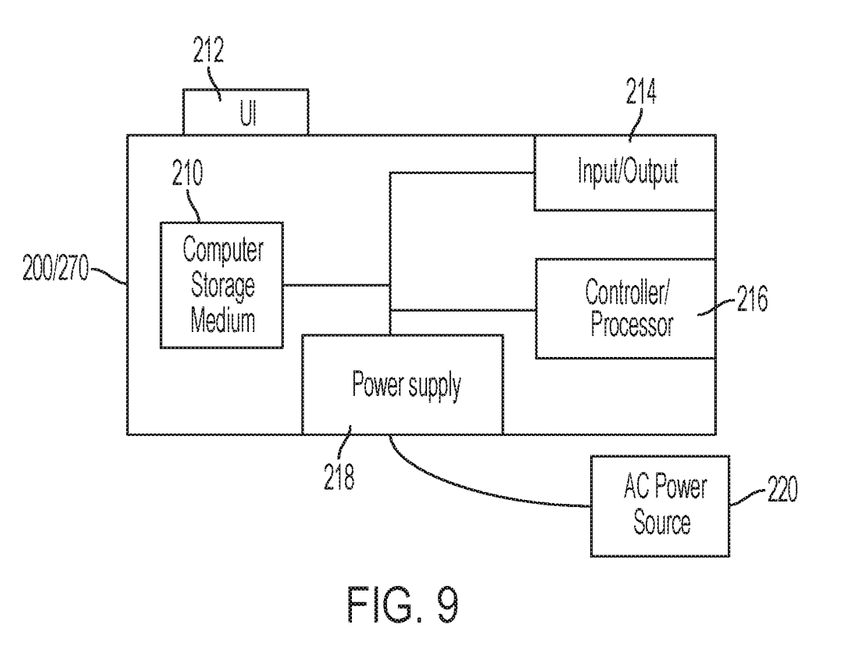
FIG. 9 is a schematic diagram illustrating devices herein.

FIG. 9 illustrates a computerized device, which can be used with systems and methods herein and can comprise, for example, a server 200, a personal computer, a portable computing device 270, etc. The computerized device 200, 270 includes a controller/tangible processor 216 and a communications port (input/output) 214 operatively connected to the tangible processor 216 and to the computerized network 202 external to the computerized device 200, 270. Also, the computerized device 200, 270 can include at least one accessory functional component, such as a user interface (UI) assembly 212. The user may receive messages, instructions, and menu options from, and enter instructions through, the user interface or control panel 212.

The input/output device 214 is used for communications to and from the computerized device 200, 270 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 9, a body housing has one or more functional components that operate on power supplied from an alternating current (AC) source 220 by the power supply 218. The power supply 218 can comprise a common power conversion unit, power storage element (e.g., a battery, etc), etc.

Figure 10:
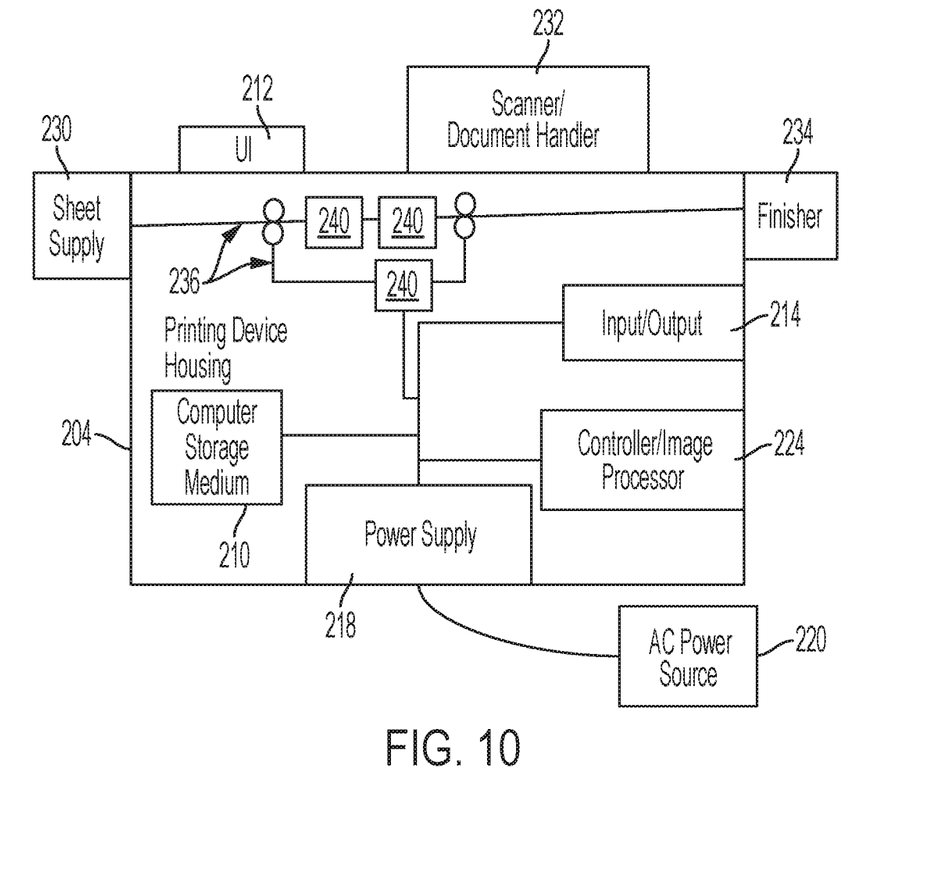
FIG. 10 is a schematic diagram illustrating devices herein.

FIG. 10 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A system comprising:
    a printer having a printing device user interface system comprising a printing device display, a printing device speaker, and a printing device transducer; and
    a computer application (app) related to the printer,
    wherein the app is provided to portable user devices that have a portable device user interface system comprising a portable device display screen, a portable device speaker, and a portable device transducer,
    wherein the app maintains different multi-modal output signatures, each corresponding to different alerts generated by the printer,
    wherein each multi-modal output signature comprises instructions for transducer output with at least one of speaker output and display output, and
    wherein the app is adapted to control at least one of: the printing device user interface system; and the portable device user interface system, to output the multi-modal output signatures.

2. The system according to claim 1, wherein the app is adapted to control the printing device user interface system and the portable device user interface system to both simultaneously provide an identical multi-modal output signature for a single alert of the different alerts generated by the printer.

3. The system according to claim 2, wherein the different alerts are based on operational statuses of printing and scanning operations of the printer.

4. The system according to claim 1, wherein the app is adapted to control:
    the portable device user interface system to output the multi-modal output signature from at least the portable device transducer; and
    the printing device user interface system to output the multi-modal output signature from at least the printing device display,
    wherein the app is adapted to control the portable device transducer and the printing device display to output the multi-modal output signature in coordination.

5. The system according to claim 1, wherein the printing device user interface system further comprises exterior lighting, and wherein the app is adapted to control the exterior lighting to output the multi-modal output signatures.

6. The system according to claim 1, wherein the printing device user interface system further comprises exterior lighting, and
wherein the app is adapted to control:
the portable device user interface system to output the multi-modal output signature from at least the portable device transducer; and
the printing device user interface system to output the multi-modal output signature only from the exterior lighting.

7. The system according to claim 1, wherein at least one of the multi-modal output signatures coordinates patterns of the transducer output, speaker output, and display output to occur in synchronization and produce an identical output pattern.

8. A system comprising:
a multi-function printer (MFP) having an MFP user interface system comprising an MFP display device, an MFP speaker, and an MFP transducer; and
a computer maintaining a computer application (app) related to the MFP,
wherein the computer is adapted to communicate with portable user devices through a computer network,
wherein the computer is adapted to provide the app to the portable user devices through the computer network,
wherein the portable user devices each include a portable device user interface system comprising a portable device display screen, a portable device speaker, and a portable device transducer,
wherein the app is adapted to control the portable user devices to communicate with the MFP,
wherein the app maintains multi-modal output signatures,
wherein each multi-modal output signature comprises instructions for transducer output with at least one of speaker output and display output,
wherein each multi-modal output signature is unique and different from all other ones of the multi-modal output signatures,
wherein each multi-modal output signature corresponds to only one of a plurality of alerts generated by the MFP, and
wherein the app is adapted to control at least one of: the MFP user interface system; and the portable device user interface system, to output the multi-modal output signatures.

9. The system according to claim 8, wherein the app is adapted to control the MFP user interface system and the portable device user interface system to both simultaneously provide an identical multi-modal output signature for a single alert of the alerts generated by the MFP.

10. The system according to claim 9, wherein the alerts are based on operational statuses of printing and scanning operations of the MFP.

11. The system according to claim 8, wherein the app is adapted to control:
the portable device user interface system to output the multi-modal output signature from at least the portable device transducer; and
the MFP user interface system to output the multi-modal output signature from at least the MFP display device,
wherein the app is adapted to control the portable device transducer and the MFP display device to output the multi-modal output signature in coordination.

12. The system according to claim 8, wherein the MFP user interface system further comprises exterior lighting, and wherein the app is adapted to control the exterior lighting to output the multi-modal output signatures.

13. The system according to claim 8, wherein the MFP user interface system further comprises exterior lighting, and
wherein the app is adapted to control:
the portable device user interface system to output the multi-modal output signature from at least the portable device transducer; and
the MFP user interface system to output the multi-modal output signature only from the exterior lighting.

14. The system according to claim 8, wherein at least one of the multi-modal output signatures coordinates patterns of the transducer output, speaker output, and display output to occur in synchronization and produce an identical output pattern.

15. A method comprising:
storing a computer application (app) in a computer;
maintaining, in the app, multi-modal output signatures, wherein each multi-modal output signature comprises instructions for transducer output with at least one of speaker output and display output, wherein each multi-modal output signature is unique and different from all other ones of the multi-modal output signatures, wherein each different multi-modal output signature corresponds to only one of a plurality of alerts generated by a printer, wherein the printer includes a printing device user interface system comprising a printing device display, a printing device speaker, and a printing device transducer; and
communicating, using the computer, with portable user devices through a computer network, wherein the portable user devices each include a portable device user interface system comprising a portable device display screen, a portable device speaker, and a portable device transducer;
providing the app from the computer to the portable user devices through the computer network;
controlling, using the app, the portable user devices to communicate with the printer; and
controlling, using the app, at least one of: the printing device user interface system; and the portable device user interface system, to output the multi-modal output signatures.

16. The method according to claim 15, further comprising:
controlling, using the app, the printing device user interface system and the portable device user interface system to both simultaneously provide an identical multi-modal output signature for a single alert of many different alerts generated by the printer; and
generating the alerts based on operational statuses of printing and scanning operations of the printer.

17. The method according to claim 15, further comprising controlling, using the app:
the portable device user interface system to output the multi-modal output signature from at least the portable device transducer; and
the printing device user interface system to output the multi-modal output signature from at least the printing device display,
wherein the app controls the portable device transducer and the printing device display to output the multi-modal output signature in coordination.

18. The method according to claim 15, wherein the printing device user interface system further comprises exterior lighting, and wherein the method further comprises controlling, using the app, the exterior lighting to output the multi-modal output signatures.

19. The method according to claim 15, wherein the printing device user interface system further comprises exterior lighting, and
wherein the method further comprises controlling, using the app:
the portable device user interface system to output the multi-modal output signature from at least the portable device transducer; and
the printing device user interface system to output the multi-modal output signature only from the exterior lighting.

20. The method according to claim 15, wherein at least one of the multi-modal output signatures coordinates patterns of the transducer output, speaker output, and display output to occur in synchronization and produce an identical output pattern.

* * * * *